United States Patent [19]
Bailey et al.

[11] 4,184,764
[45] Jan. 22, 1980

[54] FILM HOLDING SYSTEM

[75] Inventors: David C. Bailey, Cocoa Beach, Fla.; Robert E. Klein, Quincy, Ill.

[73] Assignee: Harris Corporation, Melbourne, Fla.

[21] Appl. No.: 917,178

[22] Filed: Jun. 20, 1978

[51] Int. Cl.² ............... G03B 27/58; G03B 27/60; G03B 23/08

[52] U.S. Cl. .................. 355/54; 355/72; 355/73; 353/27 A

[58] Field of Search ............ 355/54, 53, 72–76; 353/27 A

[56] References Cited
U.S. PATENT DOCUMENTS

| | | | |
|---|---|---|---|
| 2,911,884 | 11/1959 | Caudle et al. | 353/27 A |
| 3,566,524 | 3/1971 | Irasek | 353/27 R |
| 4,099,867 | 7/1978 | Spence-Bate | 355/73 |
| 4,105,325 | 8/1978 | McCollough | 355/54 |

*Primary Examiner*—L. T. Hix
*Assistant Examiner*—W. J. Brady
*Attorney, Agent, or Firm*—Craig & Antonelli

[57] ABSTRACT

A film supporting and positioning system includes a film holding or gripping head for engaging an edge portion of the film and supporting the same in a cantilever fashion. The gripping head may include a frictional contact gripping arrangement or a vacuum head by which the film is held along one edge thereof. The gripping head is displaceable in a plurality of orthogonal directions so that the film may be inserted into and oriented relative to the image plane of an optical recording/reproducing system. In the vicinity of this image plane, a film support bearing is provided, in order that a prescribed region of the film, in which information may be recorded may be properly irradiated by a light beam. Preferably, the film support bearing is provided by a fluid bearing platen which is thermodynamically non-throttling.

32 Claims, 5 Drawing Figures

FILM HOLDING SYSTEM

The United States Government has rights in this invention pursuant to contract No. F302602-74-C-0152 awarded by the Department of the Air Force.

FIELD OF THE INVENTION

The present invention relates to photographic film holding and positioning systems and is particularly directed to a system for positioning a photographic recording medium, such as a photographic microfiche that contains one or more frames of recorded information, relative to the image plane of an optical recording and/or reproducing system.

BACKGROUND OF THE INVENTION

In optical recording and/or reproducing systems, precise and accurate positioning of the recording medium (usually a photographic film) relative to the image plane of the recording/reproducing optics constitutes one of the critical considerations required for proper operation of the system. Various film handling systems have been proposed which employ a rigid mechanical device against which the film is held, in order to retain the film in the optic image plane. Because the film substrate is typically a flexible, relatively thin material, which is subject to scratching, film handling schemes have been developed which employ vacuum retaining or gripping devices through which the film is held in a prescribed position relative to the recording/reproducing optics. For example, the U.S. Pat. No. 3,674,367, to Chapman, describes a system employing a vacuum platen upon which the film is placed, the platen being positioned in the proper image location relative to the system optics. Another type of film handling system is described in the U.S. Pat. No. 3,751,163, to Sutton, which relates to an optical recording system in which a gas bearing suspension is provided between an exposure head and the film. Although vacuum holding arrangements facilitate handing of the film substrate, the physical arrangement of the system components and the manner in which the film is oriented by such components relative to the imaging optics is often time consuming and of a complex physical configuration.

SUMMARY OF THE INVENTION

In accordance with the present invention, a film supporting and positioning system is provided which enables rapid and accurate placement of a photographic film, such as a fiche, in a prescribed position relative to the image plane of recording and/or reproducing optics. For this purpose, the system includes a film holding or gripping structure through which the weight of the fiche is borne in a cantilever fashion. The holding structure may incorporate a frictional contact gripping arrangement or a suitable vacuum head by which the film is held substantially along the entirety of one edge of the fiche. The fiche holding structure is displaceable in a plurality of directions, so that the fiche may be inserted into and oriented relative to the image plane of an optical recording/reproducing system. In the vicinity of this image plane, there is positioned a suitable film supporting platen by way of which that region of the fiche within which information is to be recorded, or from which recorded information is to be read out by means of a suitable light beam, may be accurately and stably positioned relative to the imaging optics. Preferably, the platen is a fluid bearing platen that does not physically contact the fiche surface and thus prevents an alteration of the recorded information.

Figure 1:
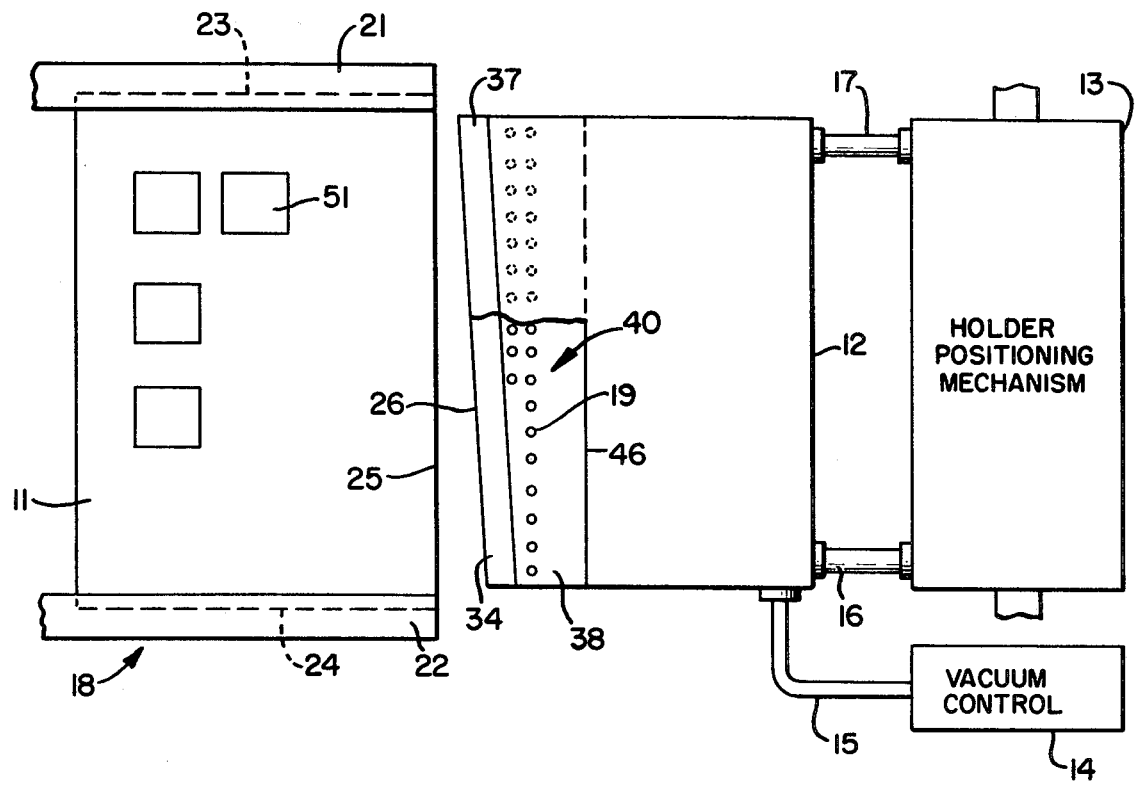
FIG. 1 is a side view of a recording medium positioning and holding mechanism in accordance with the present invention.
Figure 2:
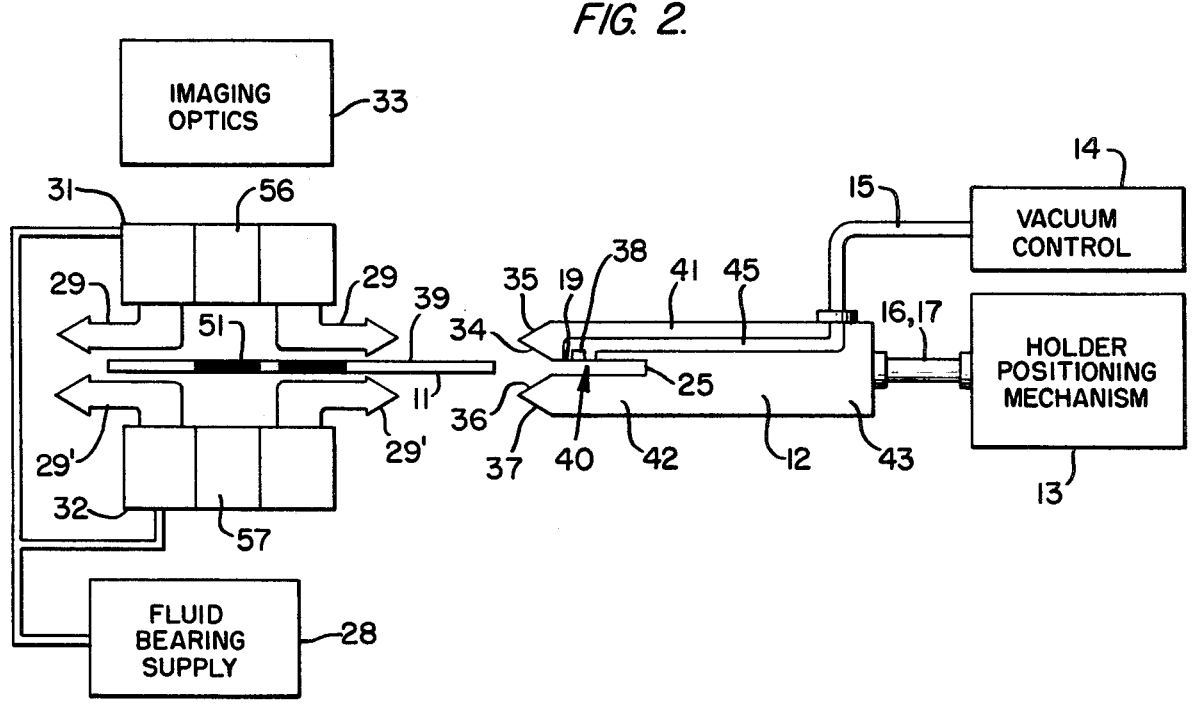
FIG. 2 is a top view of the recording medium holding and positioning mechanism shown in FIG. 1.

DETAILED DESCRIPTION:

Referring now to FIGS. 1 and 2 wherein respective side and top views of a recording medium holding and positioning system in accordance with the present invention are illustrated, there is shown a film member 11, configured as a multi-recording containing fiche, and having a plurality of regions 51 in which information may be recorded in the form of respective images of the information. Fiche 11 may be stored or carried by suitable film storage library, such as a carousel fiche library 18 having sets of upper and lower plate member 21 and 22 in which respective tracks 23 and 24 are provided. The upper and lower edges of fiche 11 slideably engage tracks 23 and 24 so that fiche 11 may be easily inserted into and removed from the fiche library 18.

Shown adjacent to edge 25 of fiche 11 is fiche holder 12. In the embodiment of the invention illustrated in FIGS. 1 and 2, fiche holder 12 is configured as a vacuum head gripping device with a plurality of suction gripping apertures 19 distributed along one face 38 of holder 12. The forward edge 26 of fiche holder 12 may be slightly inclined relative to the edge 25 of a fiche 11 in order to facilitate insertion of fiche holder 12 into the fiche storage library. Fiche holding vacuum head 12 is displaceably supported for movement in respective orthogonal directions by a suitable holder positioning mechanism 13. Holder positioning mechanism 13 may comprise a high precision (x-y) dual axis positioning unit for moving the fiche holder in vertical and horizontal directions. A suitable commercially available unit may be employed for this purpose. In the embodiment depicted in FIGS. 1 and 2, positioning mechanism 13 may be configured to contain a pair of controllable cylinders into which respective pistons 16 and 17 are inserted. Vacuum head 12 is mounted to the ends of pistons 16 and 17, so that vacuum head 12 may be displaced toward and away from the fiche holding carousel by horizontal movement of pistons 16 and 17, and upwardly by vertical displacement of the support structure upon which the cylinders are mounted, under control of holder positioning mechanism 13, so that vacuum head 12 may be controllably displaced in respective orthogonal directions. The holder positioning mechanism 13, per se, forms no part of the present invention and, as was pointed out above, any conventional orthogonal support and displacement mechanism upon which vacuum head 12 may be mounted can be used.

The vacuum head 12 itself may be configured as a slotted rigid member, such as a slotted aluminium head, having a pair of side walls 41 and 42 which extend from a base portion 43 and define a slot 40 extending parallel to the sides of fiche 11. Along the inner face of one of the side wall portions, for example along inner face 38 of side wall portion 41, there may be provided a plurality of apertures 19 that communicate with channel 45. Channel 45 is in fluid communication with a suitable vacuum control device 14, so that along aperture distributed face 38 there may be created a suction gripping action to hold an edge portion of one face of a fiche. Thus, as depicted in FIG. 2, with fiche 11 being inserted into slot 40, so that edge 25 of fiche 11 abuts against the bottom or base 46 of slot 40, the creation of a vacuum along apertures 19 will cause face 39 of fiche 11 to adhere to face 38 of wall portion 41. Since the gripping action of the fiche holder 12 is applied along one only edge portion of the fiche 11, fiche 11 is held in a cantilever fashion by holder 12, thereby leaving the remaining edge of fiche 12 unobstructed for easy insertion into and removal from the fiche storage library 18 and the imaging optics of the recorder and/or reproducer system.

More particularly, as depicted in FIG. 2, an imaging optics support platen, such as an air bearing platen described in our copending application entitled "Air Platen Bearing" Ser. No. 908,729 filed on May 23, 1978, and assigned to the assignee of the present application, may be provided for stably positioning that region 51 of fiche 11 onto which a recording or readout beam is to be directed. The air bearing platen is illustrated in FIG. 2 as comprising a pair of air bearing supply members 31 and 32 coupled to a source of bearing fluid such as a dry air pressure source 28, and creating an air bearing 29 and 29' on opposite sides of fiche 11 in the vicinity of region 51. Air bearing supply members 31 and 32 have respective optical apertures 56 and 57 through which a recording or readout beam from suitable imaging optics 33 is projected. With fiche 11 being held in cantilever fashion along one edge portion thereof by vacuum head 12, displacement of vacuum head 12 by holder positioning mechanism 13 will, in turn, cause a corresponding displacement of fiche holder vacuum head 12. Thus, by displacing vacuum head 12 under the control of positioning mechanism 13, fiche 11 may be inserted between air bearing supply member 31 and 32 so that region 51 is aligned with optical axis 53 and stably positioned by the air bearing provided thereat. As described in our above referred to copending application, the configuration and properties of the air bearing platen are such that it is thermodynamically non-throttling, thus providing a stabilizing fluid support for that portion of fiche 11 containing region 51 without establishing a temperature gradient across the fiche which would cause distortion of the fiche in the image plane of imaging optics 33. After information has been recorded on or read from image region 51 and fiche 11, the fiche 11 may be displaced by holder positioning mechanism 13 to bring another region into alignment with the optical axis 53 of imaging optics 33, or the fiche may be returned to the film library 18 by the operation of holder positioning mechanism 13 and the quenching of the vacuum supplied to vacuum head 12 by vacuum control 14, which thereby terminates the suction gripping action along apertures 19 and releases fiche 11 from vacuum head 12.

In the present embodiment, where fiche 11 may be retrieved from a carousel or other similar photographic medium storage library, the side wall portions 41 and 42 of vacuum head 12 may be advantageously tapered as by way of inclined surfaces 34 and 35 for side wall portion 41 and inclined surfaces 36 and 37 for sidewall portion 42. The inclination or tapering of opposite surfaces 34 and 36 facilitates the guiding of edge 25 of fiche 11 into slot 40 of vacuum head 12, so that an edge portion of fiche 11 may be quickly inserted into slot 40 and gripped in cantilever fashion by the vacuum supplied to apertures 19. The tapered or inclined faces 35 and 37 of side wall portions 41 and 42, respectively, facilitate the insertion of vacuum head 11 into a set or parallel arrangement of fiches so that only the intended fiche will be guided into slot 40, while those adjacent to the intended fiche will be prevented from entering slot 40 or abutting against the side wall portions 41 and 42.

Figure 3:
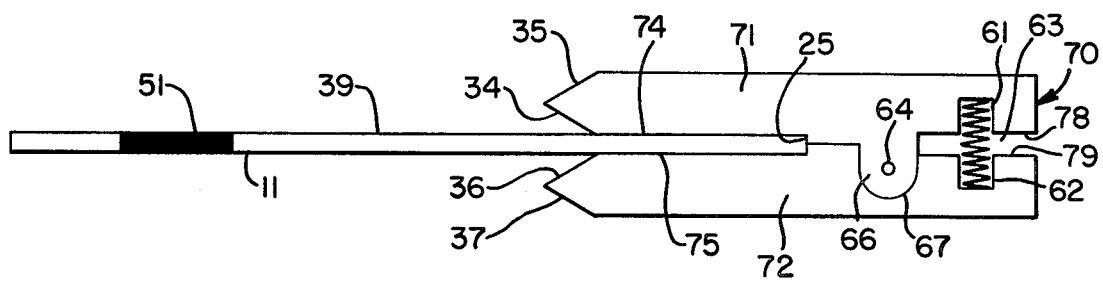
FIG. 3 is a top view of a recording medium holding member for retaining a photographic fiche in pressure frictional engagement.

In the above described embodiment, fiche 11 is held in place by a suction gripping action created along one interior face of a slotted vacuum head, the width of the slot being slightly greater than the thickness of the fiche itself, to thereby facilitate insertion and removal of an edge portion of the fiche relative to the slot. In accordance with an embodiment of the invention, illustrated in FIG. 3, fiche 11 is held in cantilever fashion by the frictional pressure of opposite sides of the slot into which an edge portion of the fiche is inserted. More particularly, the fiche holder 70 is composed of a first gripping section 71 and a second gripping section 72 pivotally connected with one another at a circularly flared portion 66 of first gripping section 71. Circularly flared position 66 of first gripping section 71 is pivotally connected by way of pivot pin 64 which passes through a hole in circularly flared portion 66 and a corresponding hole in circular depression 67 of second gripping section 72. On one side of pivot pin 64, sections 71 and 72 are provided with respective slots 61 and 62 into which a suitable compression spring 65 may be inserted, to cause rotation of each gripping sections 71 and 72 around pivot pin 64, so that opposing faces 74 and 75 of gripping sections 71 and 72 respectively come into pressure engagement with opposite sides of fiche 11. To permit insertion into and removal of fiche 11 from fiche holder 70, a separation 63 is provided between opposing faces 78 and 79 of gripping sections 71 and 72, so that by applying a force on gripping sections 71 and 72 which compresses spring 65, gripping sections 71 and 72 will pivot about pin 64 in respective directions opposite to that caused by compression spring 65. As a result, the distance between opposing faces 74 and 75 of respective gripping sections 71 and 72 will increase, permitting insertion or removal of fiche 11 into fiche holder 70. Again, as in the previously described embodiment, holder 70 may be mounted for displacement by an appropriate postioning mechanism 13, such as that shown in FIGS. 1 and 2, for bringing holder 70 into the proper position, whereby the intended imaging region 51 of fiche 11 is aligned with the optical axis 53 of the recording or read out optics where that portion of fiche 11 is supported by a suitable suspension platen, such as the above referred to air bearing platen.

Figure 4:
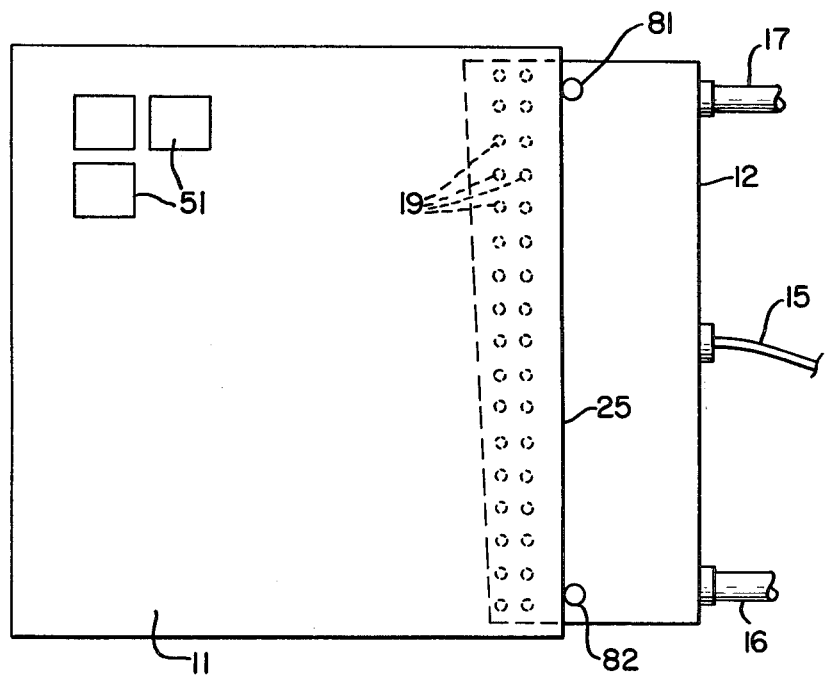
FIGS. 4 and 5 are respective side and top views of a non-slotted recording medium holding member for holding a photographic fiche by vacuum suction action.
Figure 5:
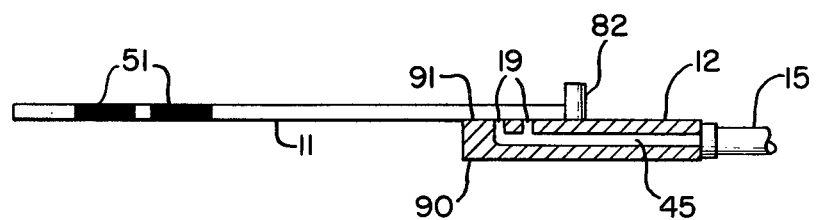

In each of the above described embodiments of the invention, the fiche holder is of a slotted configuration, facilitating insertion and removal of the fiche holder from a fiche storage library such as a carousel-configured library that contains a plurality of parallel arranged fiches. However the fiche holder need not be of a slotted configuration to achieve the cantilever gripping action provided in accordance with the present invention. Respective side and top views of a non-slotted configuration of the fiche holder in accordance with the present invention are shown in FIGS. 4 and 5. As shown therein, fiche 12 is formed of a single member 90 having a fiche engaging face 91 that contains plural suction apertures 19. As in the first embodient, apertures 19 are in fluid communication with a vacuum line 15 by way of channel 45. Edge 25 of fiche 11 abuts against a pair of pins 81 and 82 which are deposed along a line that is parallel to one edge of suction apertures 19, so that fiche 11 will be held in a cantilever support mode along face 91. In this embodiment, fiche 11 is is simply placed against pins 81 and 82 with a vacuum supplied to an edge portion of fiche 11 extends beyond the end of vacuum holder 12, so that suction apertures support fiche 11 in a cantilever mode.

Although, in the foregoing embodiments of the invention, the operation of a thermodynamically non-throttling air bearing platen has been described as a preferred implementation of a stabilizing bearing in the vicinity of that region of fiche 11 upon which a recording or reproducing light beam is directed, other bearing configurations, including both fluid and mechanical support arrangements, may be used without departing from the spirit of the invention.

As will be appreciated from the foregoing description of various exemplary embodiments of the recording medium holding mechanism in accordance with the present invention, there is provided a film support and positioning arrangement that facilitates handling and displacement of the recording medium both with respect to a storage library and the imaging optics of the recording and/or reproducing system in which the invention may be incorporated.

In this regard, the present invention may be incorporated in an optical recording and reproducing system such as that described in copending applications Ser. No. 908,726, entitled "Digital Optical Recorder Reproducer System" filed May 23, 1978, by B. Reddersen, R. Zech and H. Roberts and assigned to the assignee of the present application.

While we have shown and described several embodiments in accordance with the present invention, it is to be understood that the same is not limited thereto but is susceptible of numerous changes and modifications as known to a person skilled in the art, and we therefore do not wish to be limited to the details shown and described herein but intend to cover all such changes and modifications as are obvious to one of ordinary skill in the art.

We claim:

1. A system for supporting a recording medium and stably positioning said recording medium relative to a prescribed information communication device, comprising:
   first means for engaging said recording medium such that the weight of said recording medium is borne in a cantilever fashion at a predetermined portion thereof; and
   second means, associated with said first means, for stably maintaining a preselected portion of said recording medium the weight of which is borne in cantilever fashion by said first means within a prescribed region of said information communicating device without bearing the weight of said recording medium.

2. A system according to claim 1, wherein said information communication device is one of an information recording device and an information reproduction device.

3. A system according to claim 1, wherein said recording medium comprises a photographic film member having a plurality of photographic information recording regions distributed thereon, and wherein said preselected portion of said recording medium corresponds to a portion thereof containing one of said plurality of photographic information recording regions.

4. A system according to claim 1, wherein said first means comprises a rigid member that engages an edge portion of one face of said recording medium.

5. A system according to claim 4, wherein said first means further comprises means for causing said edge portion of said one face of said recording medium to be held in pressure contact with said rigid member.

6. A system according to claim 5, wherein said pressure contact causing means comprises at least one aperture disposed in a surface portion of said rigid member, and means, in fluid communication with said at least one aperture, for creating a reduced pressure region at said at least one aperture and thereby causing the edge portion of said one face of said recording medium to be held thereat.

7. A system according to claim 5, wherein said pressure contact causing means comprises means for directing a force on the edge portion of a face of said recording medium opposite to said one face thereof whereby the edge portion of said one face is held in contact with said rigid member.

8. A system according to claim 5, wherein said rigid member comprises a pair of wall portions defining therebetween a slot into which a said predetermined portion of said recording medium is inserted, the interior face of one of said wall portions containing at least one aperture therein, and wherein said first means further comprises means, in fluid communication with said at least one aperture, for creating a reduced pressure region at said aperture and thereby causing the edge portion of said one face of said recording medium, corresponding to said predetermined portion of said recording medium, to be held thereat.

9. A system according to claim 8, wherein said at least one aperture comprises a plurality of apertures.

10. A system according to claim 6, wherein said at least one aperture comprises a plurality of apertures.

11. A system according to claim 8, wherein the ends of said wall portions that project away from said slot have faces that are inclined relative to the opposite faces of said recording medium.

12. A system according to claim 8, wherein the ends of said wall portions that project away from said slot define edges that are inclined relative the bottom of said slot.

13. A system according to claim 7, wherein said force directing means comprises a spring clamp having first and second rigid clamp sections between which said preselected portion of said recording medium is held.

14. A system according to claim 6, wherein said rigid member comprises at least one stop member adjacent to said at least one aperture and against which an edge of said recording medium abuts, to thereby define the extent of the edge portion of said one face of said recording medium.

15. A system according to claim 1, further comprising third means, coupled to said first means, for supporting said first means and displacing said first means in respective orthogonal directions.

16. A system according to claim 1, wherein said second means comprises a bearing device for retaining said preselected portion of said recording medium within said prescribed region of said information communication device.

17. A system according to claim 16, wherein said information communication device is one of an optical information recording device and an optical information reproduction device and said prescribed region corresponds to an image plane of said information communication device.

18. A system according to claim 17, wherein said recording medium comprises a photographic film member having a plurality of photographic information recording regions distributed thereon, and wherein said preselected portion of said recording medium corresponds to a portion thereof containing one of said plurality of photographic information recording regions.

19. A system according to claim 16, wherein said bearing device comprises a thermodynamically non-throttling fluid bearing platen.

20. A system according to claim 19, wherein said information communication device is one of an optical information recording device and an optical information reproduction device and said prescribed region corresponds to an image plane of said information communication device.

21. A system according to claim 1, wherein the weight of said recording medium is borne exclusively by way of the cantilever bearing of the weight of said recording medium by said first means.

22. A system for supporting a recording medium and stably positioning said recording medium relative to a prescribed information communication device, comprising:
   first means for engaging said recording medium such that the weight of said recording medium is borne in cantilever fashion at a predetermined portion thereof and for controllably displacing said cantilever-supported recording medium into a prescribed position relative to said information communicating device; and
   second means, located at said prescribed position relative to said information communicating device, for stably maintaining a preselected portion of said recording medium within a prescribed region of said portion without bearing the weight of said recording medium.

23. A system according to claim 22, wherein said first means comprises means for gripping said recording medium along substantially the entirety of one edge thereof, whereby the weight of said recording medium is borne in cantilever fashion along substantially the entirety of said one edge.

24. A system according to claim 23, wherein said gripping means comprises means for gripping said one edge of said recording medium along only one face thereof.

25. A system accordng to claim 22, wherein the weight of said recording medium is borne exclusively by way of the cantilever bearing of the weight of said recording medium by said first means.

26. A system according to claim 24, wherein said gripping means comprises at least one aperture disposed in a surface portion of said rigid member, and means, in fluid communication with said at least one aperture, for creating a reduced pressure region at said at least one aperture and thereby causing the edge portion of said one face of said recording medium to be held thereat.

27. A system according to claim 21, wherein said first means comprises a pair of wall portions defining therebetween a slot into which a predetermined portion of said recording medium is inserted, the interior face of one of said wall portions containing at least one aperture therein, and wherein said first means further comprises means, in fluid communication with said at least one aperture, for creating a reduced pressure region at said aperture and thereby causing the edge portion of said one face of said recording medium, corresponding to said predetermined portion of said recording medium, to be held thereat.

28. A system according to claim 27, wherein the ends of said wall portions that project away from said slot have faces that are inclined relative to the opposite faces of said recording medium.

29. A system according to claim 27, wherein the ends of said wall portions that project away from said slot define edges that are inclined relative the bottom of said slot.

30. A system according to claim 24, wherein said first means comprises a rigid member having at least one aperture for applying a vacuum gripping action to said one edge of said recording medium and including at least one stop member adjacent to said at least one aperture and against which an edge of said recording medium abuts, to thereby define the extent of the edge portion of said one face of said recording medium.

31. A system according to claim 21, wherein said second means comprises a fluid bearing platen.

32. A system according to claim 31, wherein said fluid bearing platen is thermodynamically non-throttling.

* * * * *